(12) United States Patent
Foucoin et al.

(10) Patent No.: US 10,746,243 B2
(45) Date of Patent: Aug. 18, 2020

(54) DISC BRAKE COMPRISING AT LEAST ONE RESILIENT RETURN SPRING OF A BRAKE PAD, RESILIENT RETURN SPRING, GUIDING SLIDE AND REPLACEMENT KIT

(71) Applicant: FOUNDATION BRAKES FRANCE, Drancy (FR)

(72) Inventors: Alexandre Foucoin, Montevrain (FR); Didier Montegu, Livry Gargan (FR); Xavier Labarre, Saint Georges du Bois (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 0 days.

(21) Appl. No.: 15/555,751

(22) PCT Filed: Mar. 4, 2016

(86) PCT No.: PCT/EP2016/054695
§ 371 (c)(1),
(2) Date: Sep. 5, 2017

(87) PCT Pub. No.: WO2016/142303
PCT Pub. Date: Sep. 15, 2016

(65) Prior Publication Data
US 2018/0051760 A1 Feb. 22, 2018

(30) Foreign Application Priority Data
Mar. 6, 2015 (FR) ...................................... 15 51891

(51) Int. Cl.
*F16D 65/62* (2006.01)
*F16D 65/097* (2006.01)
(Continued)

(52) U.S. Cl.
CPC ..... *F16D 65/0974* (2013.01); *F16D 55/2262* (2013.01); *F16D 65/0972* (2013.01);
(Continued)

(58) Field of Classification Search
CPC ............. F16D 65/0974; F16D 65/0972; F16D 65/0978; F16D 65/0979; F16D 2065/1396; F16D 55/2262
(Continued)

(56) References Cited

U.S. PATENT DOCUMENTS 8,973,719 B2 * 3/2015 Rossignol ............. F16D 65/095
188/73.31
9,080,624 B2 7/2015 Merrien et al.
(Continued)

FOREIGN PATENT DOCUMENTS

DE 10 2012 016 737 A1 2/2014
EP 2 792 899 A1 10/2014
(Continued)

OTHER PUBLICATIONS

International Search Report, dated May 27, 2016, from corresponding PCT application No. PCT/EP2016/054695.
(Continued)

*Primary Examiner* — Bradley T King
(74) *Attorney, Agent, or Firm* — Young & Thompson

(57) ABSTRACT

Disclosed is a disc brake including a stationary support arm which includes a C-shaped recess, a slide which fits closely to the walls of the recess, a brake pad including two lateral lugs, each of which is received in a recess with a slide inserted therebetween, and a spring for resiliently returning the brake pad to its inoperative position, including a portion for attachment to the stationary support. The attachment portion includes an attachment tab, at least one flange of the slide includes an attachment strip, and the attachment tab
(Continued)

and the attachment strip include complementary element for connection by form-fitting interaction.

17 Claims, 7 Drawing Sheets

(51) Int. Cl.
    *F16D 55/226*     (2006.01)
    *F16D 65/02*     (2006.01)

(52) U.S. Cl.
    CPC ..... *F16D 65/0978* (2013.01); *F16D 65/0979* (2013.01); *F16D 2065/1396* (2013.01)

(58) Field of Classification Search
    USPC .................................. 188/73.38, 73.37, 72.3
    See application file for complete search history.

(56) References Cited

U.S. PATENT DOCUMENTS

| | | | | |
|---|---|---|---|---|
| 2012/0222925 | A1* | 9/2012 | Kaneko | F16D 65/0977 188/73.38 |
| 2014/0305753 | A1* | 10/2014 | Macy | F16D 65/0972 188/216 |
| 2014/0305754 | A1* | 10/2014 | Bernard | F16D 65/0972 188/250 E |
| 2014/0318905 | A1* | 10/2014 | Merrien | F16D 55/2265 188/73.38 |
| 2014/0326548 | A1* | 11/2014 | Merrien | F16D 65/0006 188/73.38 |
| 2015/0211589 | A1* | 7/2015 | Mallmann | F16D 65/0977 188/18 A |
| 2016/0053837 | A1* | 2/2016 | Lou | F16D 55/225 188/73.38 |
| 2017/0299004 | A1* | 10/2017 | Mallmann | F16D 55/225 |
| 2018/0023643 | A1* | 1/2018 | Foucoin | F16D 55/227 188/73.32 |

FOREIGN PATENT DOCUMENTS

| | | |
|---|---|---|
| FR | 3 004 500 A1 | 10/2014 |
| FR | 3 005 127 A1 | 10/2014 |

OTHER PUBLICATIONS

FR Search Report, dated Jan. 21, 2016, from corresponding FR application No. 1551891.

* cited by examiner

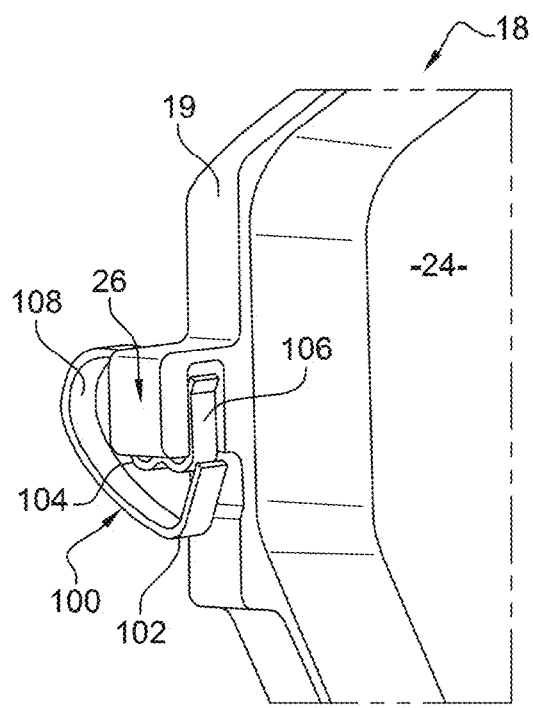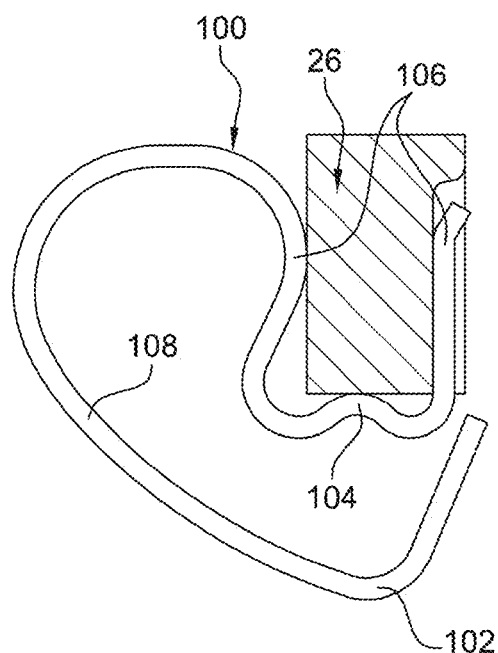
Fig. 3A  Fig. 3B
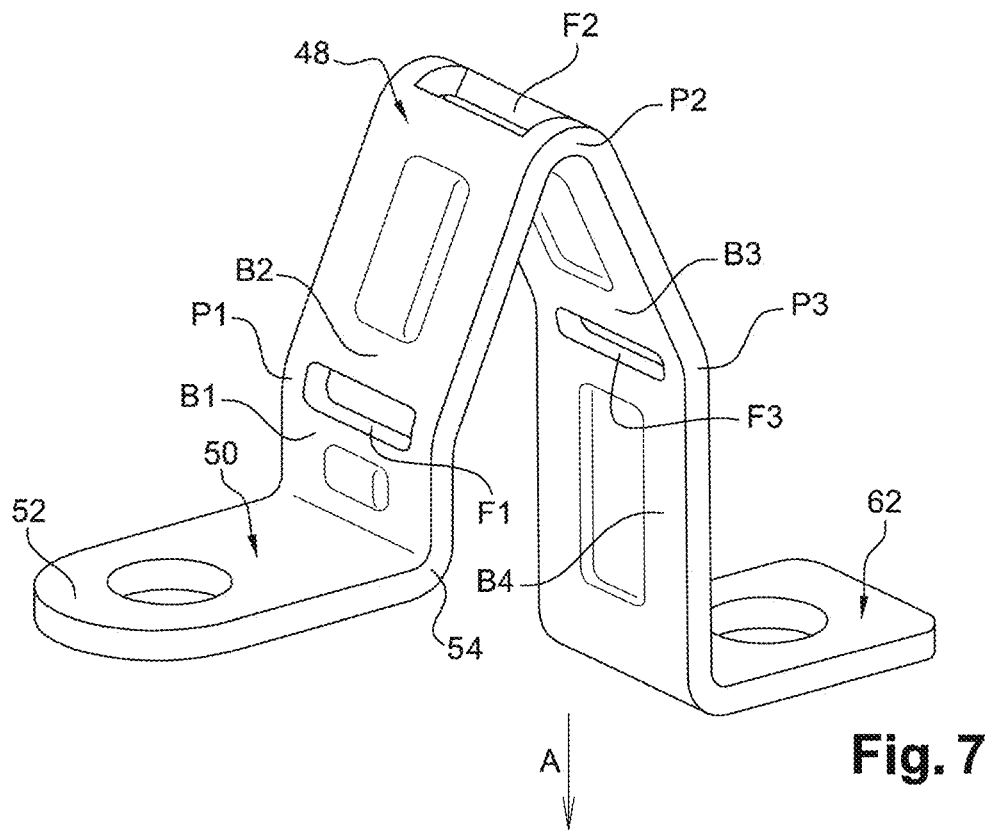
Fig. 7

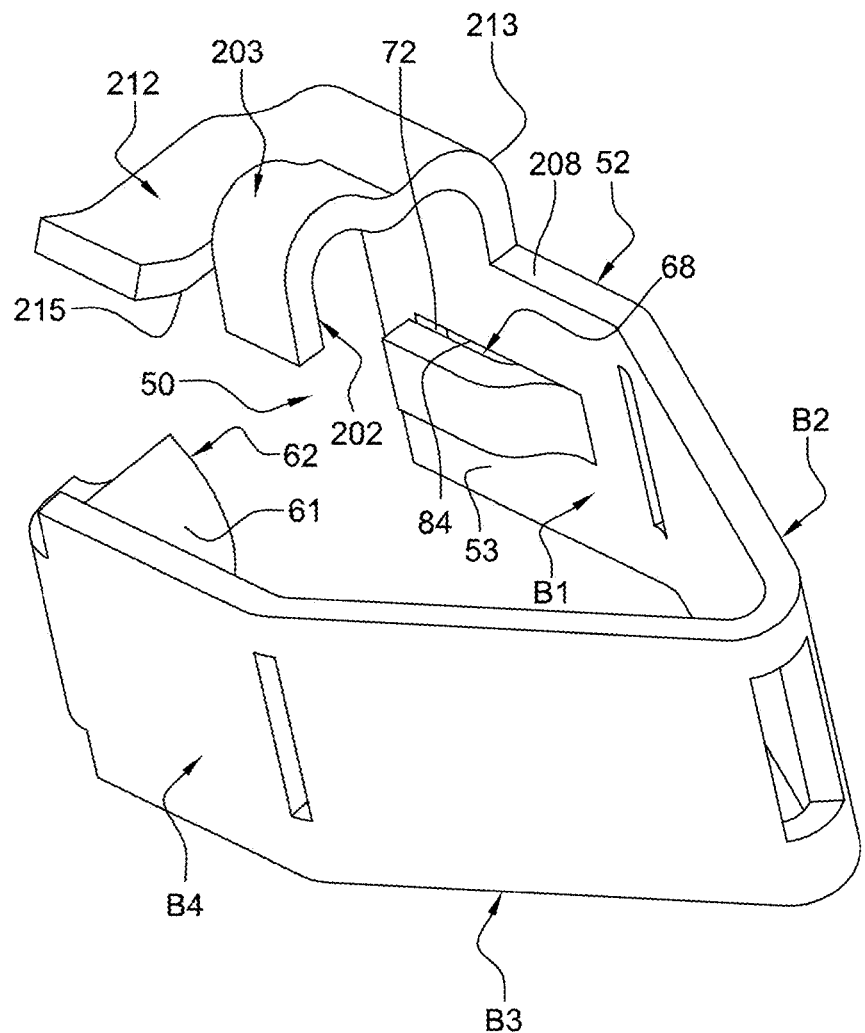
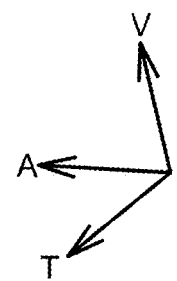
Fig. 9 ically is oriented axis of rotation of the disc;
a support being fixed with respect to a vehicle chassis;
at least one brake pad each of which includes a friction lining a friction transverse face of which cooperates with an associated braking track of the disc, the brake pad being axially slidingly mounted in the support between an active front position in which said friction face is bearing against the associated annular track of the disc, and an inactive rear position in which said friction face is axially spaced apart from said associated annular track of the disc, by a determined operating play;
at least one spring for elastically returning the brake pad to its inactive position, which is for example interposed between the brake pad and the support.

DISC BRAKE COMPRISING AT LEAST ONE RESILIENT RETURN SPRING OF A BRAKE PAD, RESILIENT RETURN SPRING, GUIDING SLIDE AND REPLACEMENT KIT

TECHNICAL FIELD OF THE INVENTION

The invention relates to a disc brake for an automotive vehicle.

The invention relates in particular to a disc brake a spring of which for elastically returning a brake pad including means for taking up the wear play of a friction lining of the brake pad.

TECHNICAL BACKGROUND OF THE INVENTION

The invention relates for example to a disc brake for an automotive vehicle of the type described and represented in French patent application FR-A1-3.004.500 which includes:
a brake disc which extends in a plane transverse to an axially is oriented axis of rotation of the disc;
a support being fixed with respect to a vehicle chassis;
at least one brake pad each of which includes a friction lining a friction transverse face of which cooperates with an associated braking track of the disc, the brake pad being axially slidingly mounted in the support between an active front position in which said friction face is bearing against the associated annular track of the disc, and an inactive rear position in which said friction face is axially spaced apart from said associated annular track of the disc, by a determined operating play;
at least one spring for elastically returning the brake pad to its inactive position, which is for example interposed between the brake pad and the support.

In a disc brake, the sliding of the brake pads to their active position is controlled by a piston. Both brake pads then strongly clamp the disc to slow its rotation. The braking operation is thus an active operation.

The brake pads are pushed back to their inactive position by the rotating disc. Thus, this is a passive operation.

However, the disc occasionally does not push back the brake pads with sufficiently force to space them apart sufficiently from the disc. This can for example happen when the sliding of the brake pads is of an insufficient, or even seized quality, or if the design creates some "recovery".

Even though the brake pads are no longer actively tightened against the disc, each of the annular tracks of the latter, nonetheless, permanently rubs against the friction lining carried by the associated brake pad. The friction linings thus undergo a premature non-functional wear.

Moreover, this permanent rubbing is likely to cause a warm-up damageable for some members of the disc brake.

This permanent rubbing also causes the appearance of a residual torque which comes against the disc rotation. This increases the vehicle consumption, while reducing the vehicle performance.

To solve these wear and warm-up problems, the above-mentioned document provides a disc brake wherein the elastic return spring includes means for taking up a wear play of the friction lining of the brake pad which are plastically deformed when the stroke of the brake pad to its active position is higher than said determined operating play.

To that end, the elastic return spring, which is interposed between the fixed support of the disc brake and an associated brake pad, includes at least one axially orientated segment which is elastically deformable by tension between a standby state and a maximum elongation state the value of which is equal to the determined operating play, the spring including at least one plastically deformable segment, under the effect of an axial tensile strain, forming said means for taking up the wear play, this plastically deformable segment being shaped to be plastically elongated when the stroke of the brake pad up to its active position is higher than the determined operating play.

According to the embodiment provided in this document, the elastic return spring includes in particular a portion for attaching the elastic return spring to the fixed support, and a rigid branch with a generally axial orientation the free end segment of which is shaped to cooperate with the associated brake pad. According to another known design, the free end segment is attached to the brake pad.

Such designs result in complex mounting and assembly to ensure cooperation of the return spring with the brake pad, or its attachment to the brake pad.

These drawbacks also exist when the return spring does not include a plastically deformable segment.

BRIEF SUMMARY OF THE INVENTION

In order to overcome this drawback, the invention provides a disc brake characterised in that it includes:
a brake disc which extends in a plane transverse to an axially oriented axis of rotation of the disc;
a fixed support including at least two opposite arms with a generally vertical orientation each including a C-shaped cross-section axial housing horizontally opening towards the opposite arm and which is delimited by an upper face and a lower face with a generally horizontal orientation;
for each arm of the fixed support, a rail which closely fits to the walls of the housing, which is attached to the fixed support and which includes at least one C-shaped cross-section sliding axial upper part which is received and locked in the associated housing, this upper part including an horizontal lower wing, an horizontal upper wing, and a bottom vertical wing which connects both lower and upper wings together;
at least one brake pad including two assembling opposite lateral lugs each of which is received in an associated housing of an associated arm with a said rail interposed therebetween;
wherein said at least one brake pad includes a vertical transverse plate which carries a friction lining a friction transverse face of which cooperates with an associated braking track of the disc, the brake pad being axially slidably mounted in the fixed support between an active front position in which said friction face bears against the associated braking track of the disc, and an inactive rear position in which said friction face is axially spaced apart from said associated braking track of the disc, by a determined operating play;
and at least one spring for elastically returning the brake pad to its inactive position including at least one portion for attaching the elastic return spring to the fixed support, and including a rigid connection branch, with an axial orientation parallel to the sliding direction of the brake pad, and which is connected to the brake pad,
characterised in that:
the portion for attaching the elastic return spring to the fixed support includes an attachment tab which forwardly extends along an axial direction parallel to the sliding direction of the brake pad;

at least one wing of the rail associated with this spring includes an attachment tongue which extends axially rearwardly;

the attachment tab and the attachment tongue include complementary cooperation connection means having complementary shapes.

According to other characteristics of the disc brake:

the complementary cooperation connection means having complementary shapes of the attachment tongue and the attachment tab cooperate by elastic socketing when assembled;

the attachment tongue is a strip which extends in an axial plane;

the attachment tab is a strip which extends in a plane parallel to said axial plane;

the attachment tongue and the attachment tab are adjacent, plane on plane;

said complementary connection means include at least one transverse orientation finger orthogonal to said axial plane which is carried by the attachment tab and which is received in a notch formed in the attachment tongue;

the free end segment of the connection branch is a strip which extends in a vertical axial plane orthogonal to the plane of the disc and which makes up said attachment tab;

the attachment tab is shaped as a clamp in which the attachment tongue is received;

said clamp includes said strip and a parallel blade which carries said finger;

the attachment tab includes a tab for stabilizing the elastic return spring which cooperates with a portion of said rail;

said stabilizing tab extends transversally and horizontally from an axially orientated edge of the attachment tab and cooperates with a portion of an horizontal wing of the rail;

said one horizontal wing of the rail includes a stabilizing tongue which extends axially rearwardly in the horizontal plane of this horizontal wing, and the stabilizing tab is bearing against an upper face of the stabilizing tongue;

the attachment tab of the elastic return spring includes an abutment tab which is in contact, axially forwardly, with an opposite abutment face of the rail;

said abutment tab extends from said axially orientated edge of the attachment tab;

said at least one wing of the rail which includes the attachment tongue is the bottom vertical wing of the rail;

the elastic return spring includes means for taking up a wear play of the friction lining of the brake pad, which are plastically deformed when a stroke of the brake pad up to its active braking position is higher than said determined operating play;

the elastic return spring is made as a single piece by cutting and forming a material sheet.

The invention provides a spring for axially returning a brake pad, of a disc brake, to an inactive position, wherein the elastic return spring includes:

a portion for attaching the elastic return spring to a fixed support of a disc brake; and a connection branch which is directly or indirectly connected to the brake pad;

characterised in that the portion for attaching the elastic return spring to the fixed support includes an attachment tab which forwardly extends along an axial direction parallel to the sliding direction of the brake pad, and which includes complementary cooperation connection means with complementary shapes, with a component attached to the fixed support.

According to other characteristics of the elastic return spring:

it includes means for taking up a wear play of a friction lining of the brake pad, which are interposed between said attachment portion and said rigid branch, and which are plastically deformed when a stroke of the brake pad, along an axial direction of movement up to an active braking position, is higher than a determined operating play;

it is made as a single piece by cutting and forming a material sheet.

The invention also provides a rail for axially slidingly guiding a brake pad of a disc brake which closely fits to the walls of a housing complementary of a fixed support of the disc brake, and which includes a C-shaped cross-section sliding part including an horizontal lower wing, an horizontal upper wing, and a bottom vertical wing which connects both lower and upper wings together, characterised in that at least one wing of the rail includes an attachment tongue which extends axially and which includes complementary cooperation connection means with complementary shapes, with a spring for elastically returning the brake pad.

According to another characteristic of the rail, it is made as a single piece by cutting and forming a material sheet.

The invention provides a replacement kit for a disc brake for an automotive vehicle according to the invention, characterised in that it includes at least one brake pad and two elastic return springs paired with said brake pad each of which being made according to the invention.

The replacement kit can further include two springs for mounting the brake pad in the disc brake.

BRIEF DESCRIPTION OF THE FIGURES

Further characteristics and advantages of the invention will appear upon reading the detailed description that follows understandable by referring to the appended drawings in which:

FIG. 3A is a perspective schematic view which illustrates an exemplary embodiment in which each lug of a brake pad is equipped with a "radial" spring;

FIG. 3B is a detailed view of the representation of FIG. 3A;

FIG. 7 is a perspective detailed view which represents an elastic return spring of the brake pad as a plastically deformable single piece according to an alternative design;

FIG. 9 is a perspective view illustrating an exemplary embodiment of an elastic return spring according to the invention designed for being attached to the rail illustrated in FIG. 8;

DETAILED DESCRIPTION OF THE FIGURES

In the rest of the description, elements having an identical structure or analogous functions are designated by the same references.

By way of non-limiting purpose and without reference to the terrestrial gravity, axial, vertical and transverse orientations will be assumed with reference to the trihedral "A,V,T" of the figures.

The axial orientation "A" is directed from rear to front, in parallel with an axis "B" of rotation of the disc 12.

The horizontal plane is defined as being a transverse axial plane.

Figure 1:
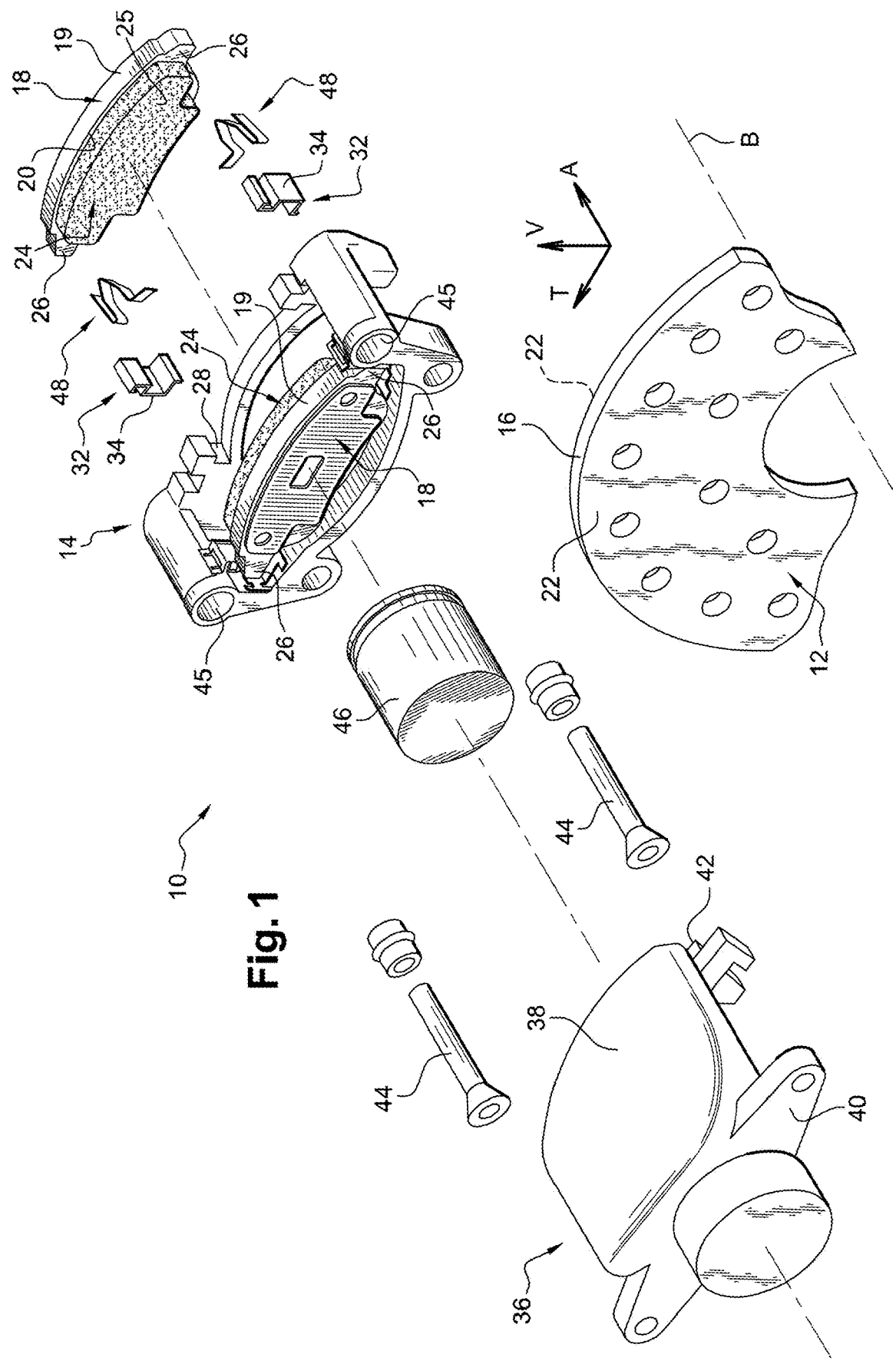
FIG. 1 is an exploded perspective view which represents a disc brake including an exemplary single piece elastic return spring according to the state of the art.
Figure 2:
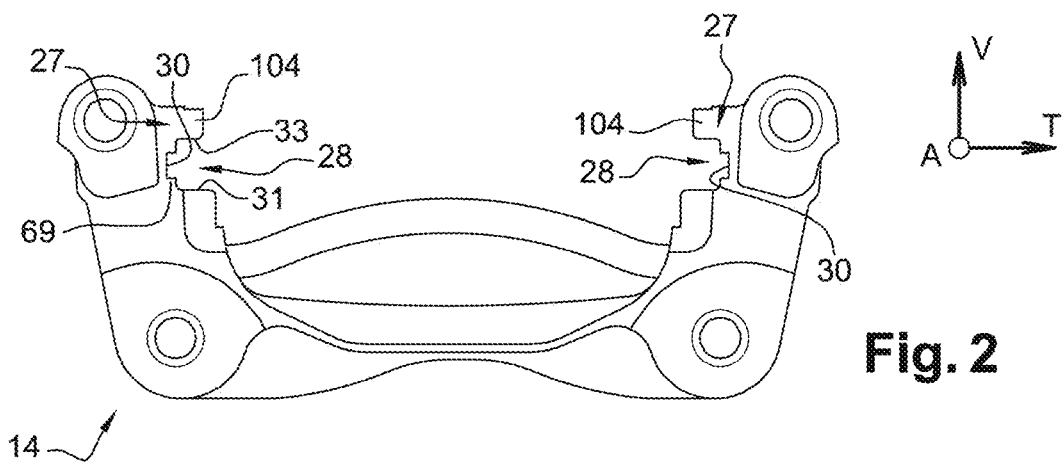
FIG. 2 is a front view which represents the fixed support of the disc brake of FIG. 1 provided with slides to receive elastic return springs of an associated brake pad.

A disc brake 10 for an automotive vehicle is schematically represented in FIG. 1. This is here a disc brake 10 known as "floating calliper" or "sliding calliper" disc brake.

In a known manner, the disc brake includes a disc 12 which is rotatably mounted about an axis "B" of rotation with an axial orientation. The disc 12 is rotatably integral with a wheel (not represented) of the automotive vehicle.

The disc brake 10 includes a support 14, also called a cap, which is fixedly mounted relative to the chassis (not represented) of the vehicle. The fixed support 14 overlaps a peripheral edge 16 of the disc 12.

Two rear and front (also called internal and external) opposite brake pads 18 are slidably axially mounted in the fixed support 14 on either side of the disc 12.

Both rear and front brake pads 18 have a structure and an arrangement on the fixed support 14 which are symmetrically identical with respect to a median vertical transverse plane.

Thereafter, only the rear brake pad 18, on the left considering FIG. 1, will be described, the description being applicable to the front brake pad 18 by reversing rear and front directions.

The rear brake pad 18 is in the form of a vertical transverse plate 19 being a support of a friction lining. The rear brake pad 18 has a front face 20, which is oriented to a rear face 22 opposite the disc 12 which has an annular track shape. The front face 20 carries a friction lining 24 a friction front transverse and vertical face 25 of which is able to cooperate with the face 22 of the disc 12.

Each of the opposite transverse ends of the brake pad 18 includes a lateral lug 26 which is slidably mounted, with a play, in an associated housing or slide 28 of an associated arm 27 of the cap or fixed support 14.

Each slide 28 is axially oriented and has, in a cross-section through a vertical transverse plane orthogonal to the axes A and B, an open "C"-shape transverse to the associated lateral lug 26 of the brake pad 18. The slide 28 is transversally delimited by an axial and generally vertical orientation bottom 30, and it is vertically delimited, upwards by an upper horizontal and axial face 33, and downwards by a lower horizontal and axial face 31.

A rail 32 is here transversally interposed between each lateral lug 26 and the associated slide 28.

The design of such a rail is illustrated and described in detail in document FR-A1-3.005.127.

Figure 4:
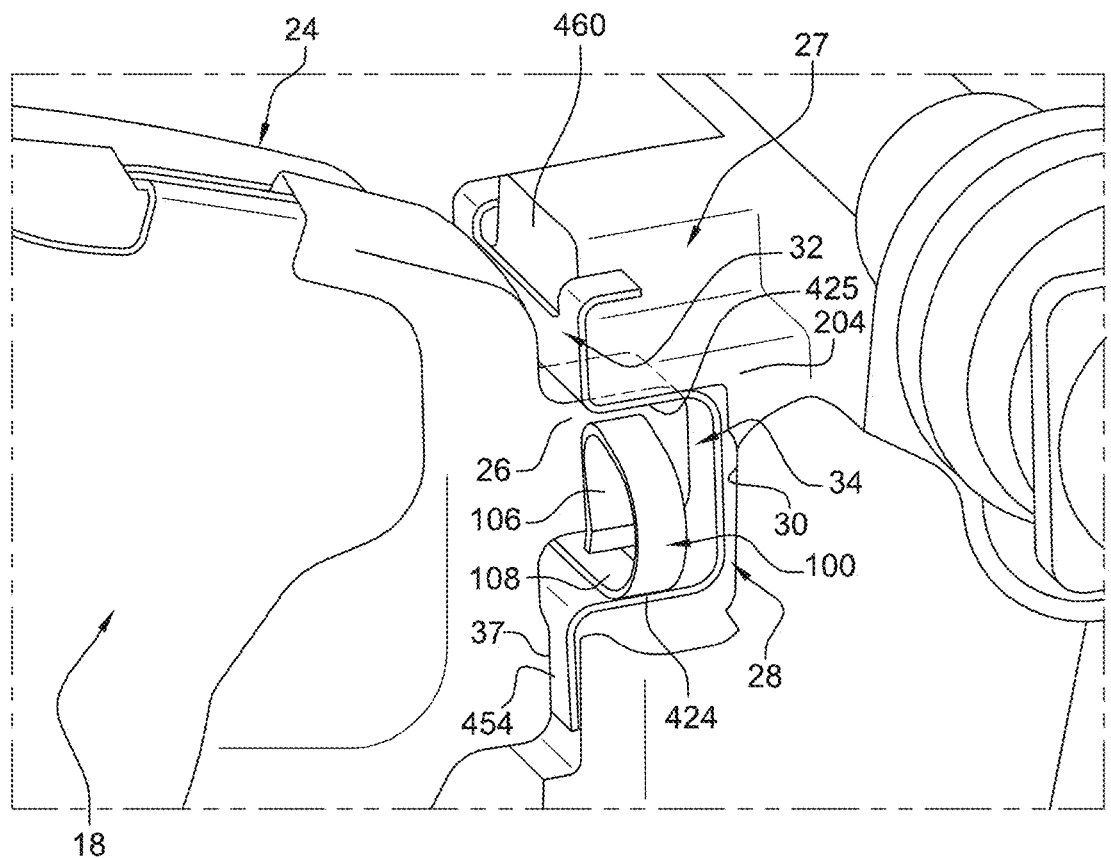
FIG. 4 is a perspective partial view illustrating the assembly of a brake pad with a radial spring in an arm of a fixed support forming cap provided with a secured rail.

Each rail 32 is a lamellar element formed by a "C" cross-section leaf spring which closely fits to the walls of the associated slide 28 (see in particular FIG. 4).

Each lug 26 is here axially slidingly received in its associated housing 28 with an associated spring steel lamellar element 32 interposed therebetween.

Figure 5:
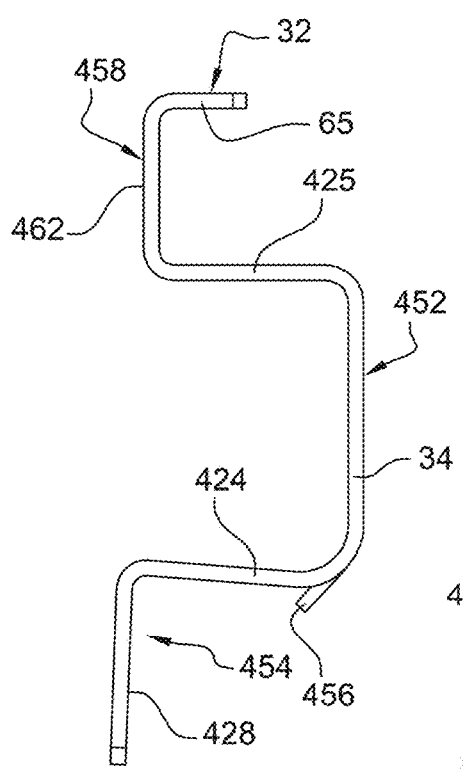
FIGS. 5 and 6 are two views illustrating in detail the design of a rail forming lamellar element according to the state of the art.
Figure 6:
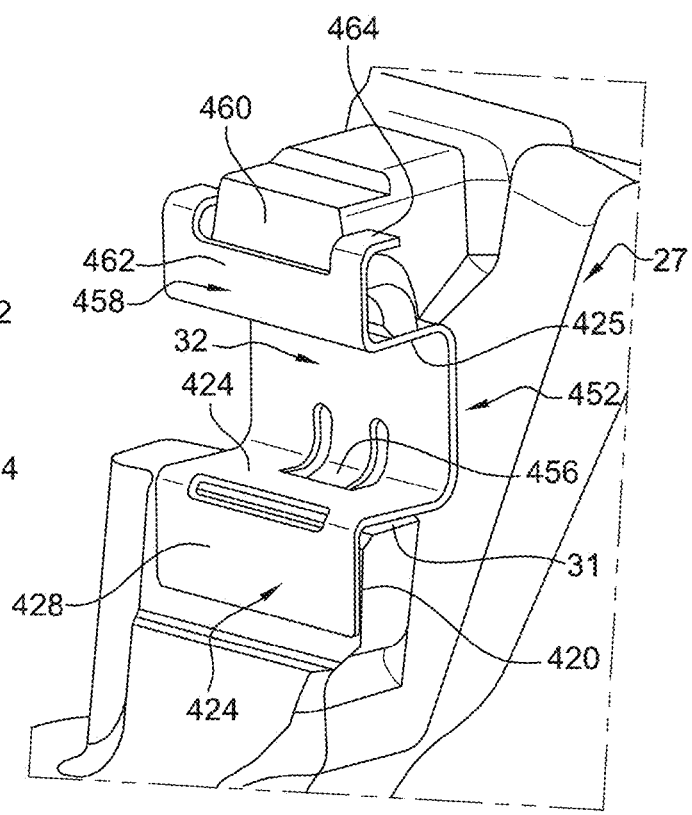

As more particularly illustrated in FIGS. 5 and 6, such a rail-shaped lamellar element 32 includes a C-shaped cross-section upper part 452, with an axial orientation called sliding, which is received and locked in the associated housing 28, which includes a first sliding lower wing 424, with a substantially generally horizontal orientation, which is interposed between the branch 108 for sliding the pad spring 100 and the lower face 31 of the housing 28 of the fixed support 14.

The upper part 452 includes a second vertical bearing upper wing 425, with a generally horizontal orientation, which is interposed between an upper horizontal facet of the associated lateral lug 26 of the brake pad 18 and the upper horizontal face 33 of the associated housing 28.

The lamellar element 32 further includes a bearing lower part 454, with an axial orientation, including a third transverse bearing wing 428 which is an extension of the sliding wing 424, which extends in a vertical plane orthogonal to the plane of the sliding wing 424. The bearing lower part 454 is arranged in contact with a transverse re-bearing surface 420 belonging to the arm 27 of the fixed support 14, and it is able to form a transverse abutment for an associated vertical lower facet 37 of the brake pad 18.

Thus, the lamellar element 32 includes a first sliding lower wing 424 which is generally parallel to the second vertical bearing upper wing 425.

Both upper 425 and lower 424 horizontal wings are connected to each other by a wing or bottom 34 with a vertical axial orientation which is arranged facing the vertical bottom 30 of the housing 28, and which is interposed between the lateral lug 26 and the vertical bottom 30 of the housing or slide 28.

On the other end, the third transverse bearing wing 428, external to the housing 28, is substantially orthogonal to the first sliding lower wing 424.

The lamellar element 32 further includes an axial immobilisation upper part 458, which is an upwardly extension of the second vertical bearing wing 425, and which cooperates with a part 460 complementary to the arm 27 to axially immobilise the lamellar element 32 relative to the arm 27.

The first sliding lower wing 424 includes an anchoring tongue 456 which is cut in the first lower wing 424, which projects downwards, and which cooperates with the lower face 31 of the housing 28 to be anchored in this lower face 31 of the housing 28, as represented in FIGS. 5 and 6, and thus to ensure a "plane on plane" contact between the wing 425 and the associated opposite surface.

As illustrated in FIGS. 4 and 6, the part 460 complementary to the arm is shaped as a stud with an axial length lower than that of the housing 28 and the immobilisation part 458 of the lamellar element 32 includes essentially a fourth vertical wing 462 from which extend two tabs 464 clamping the stud-shaped part 460 which makes up an axial abutment the two opposite tabs 464 cooperate with.

The rail or lamellar element 32 allows a determined degree of movement of the brake pad 18 on the fixed support 14, that is, generally but in a non-limiting way, an axial sliding movement, and a transverse sliding movement accompanying the rotation of the disk 12, during a braking action.

In a non-limiting way, each lateral lug 26 can be equipped with a so-called mounting spring, of the type described and represented in document FR-A1-2.925.636 and an example of which is illustrated in detail in FIGS. 3A, 3B and 4.

FIG. 4 illustrates the assembly of a mounting spring to a lateral lug 26 and the mounting of the lug thus equipped in an associated rail 32.

FIGS. 3A, 3B and 4A schematically represent a spring 100 for mounting the brake pad 18, also called a radial spring, likely to equip the lugs 26 of a brake pad 18 for mounting and guiding the brake pad 18 in the associated axial slides 28 of the fixed support 14, with the presence or not of rails 32.

In a known manner, each pad spring 100 includes a sliding lower branch 102 which cooperates with a lower horizontal face of the associated slide and which biases an upper horizontal facet of the lug 26 vertically bearing upwards against an upper face opposite the slide 28.

According to the arrangement illustrated, the pad spring 100 is commonly called an "helical spring" and it includes a branch 104 bearing under an horizontal lower facet of the lug 26 of the brake pad 18, this branch 104 being part of an attachment branch, or fastener, 106, which elastically pinches the lug 26 to ensure attachment of the pad spring 100 to the lug 26.

The pad spring 100 further includes a curved branch 108 which connects the attachment branch 106 to the sliding lower branch 102 by mainly ensuring elasticity of the pad spring 100.

The brake pad 18 is thus slidably mounted along an axial direction, parallel to the axis of rotation B of the disk 12, in the fixed support 14 on an operating stroke between:

an active front position in which the friction front transverse face 25 of the friction lining 24 bears against the face 22 opposite the disk 12; and an inactive rear position in which the friction front transverse face 25 of the friction lining 24 of the brake pad 18 is axially spaced apart from the associated face 22 of the disk 12, by a determined operating play "J1".

During a braking operation, the tightening of the brake pads 18, from their inactive position to their active position, is controlled by a brake calliper 36 of the disk brake 10.

In a known manner, the calliper 36 includes an arch 38 which axially extends above the fixed support 14 by covering it and two rear 40 and front 42 wings which radially extend from rear and front end edges of the arch 38 to the axis "B".

The front wing 42 extends facing the front brake pad 18, and the rear wing 40 extends facing the rear brake pad 18.

The calliper 36 is here axially slidably mounted relative to the fixed support 14 through two parallel guide pins 44 each of which is slidingly received in an associated axial bore 45 of the fixed support 14.

In a known manner, the rear wing 40 of the calliper 36 carries at least one axial piston 46 a bearing front transverse face of which is likely, during a braking operation, to cooperate with the opposite transverse face of the rear braking pad 18 to axially forwardly bias it, to exert an axial tightening strain of the friction front transverse face 25 of the friction lining 24 bearing against the face 22 opposite the disk 12.

By reaction, the calliper 36 axially rearwardly slides and, in a symmetric manner, the front wing 42 biases the front brake pad 18 to tighten the friction rear transverse face 25 of the friction lining 24 of the front brake pad 18 bearing against the front face 22 opposite the disk 12.

When, at the end of the braking operation, the piston 46 stops biasing the rear brake pad 18, the return of the brake pads 18, from their active position to their inactive position, is generally caused by the rotation of the disk 12 which "pushes back" each brake pad 18 to its inactive position.

However, in some cases, it has been noticed that the repulsive force exerted by the disk 12 is not sufficient to push back each of the brake pads 18 to its respective inactive position. The friction lining 24 of the brake pads 18 thus continues to rub against the disk 12, whereas no tightening action of the friction linings of the brake pads by the calliper 36 is commanded.

At the end of a braking operation, to ensure that each brake pad 18 comes back to an inactive position, the disk brake 10 is equipped with means for elastically returning the brake pad 18 to its inactive position. These elastic return means are made as elastic return springs which are interposed between the brake pad 18 and the fixed support 14.

The disk brake 10 includes by way of non-limiting example four elastic return springs 48, also called "spacer" springs, each of which—by way of non-limiting example—is here arranged between an arm 27 of the fixed support 14 and an associated lateral lug 26 of a brake pad 18.

Thus, a rear or front brake pad 18 is here associated with two elastic return springs 48 each of which directly or indirectly cooperates with the friction lining carrier plate 19.

In a non-limiting way, the four elastic return springs 48 are of a same general design and they are arranged in the same manner on the fixed support 14. The design principle of a single of these elastic return springs 48 of the rear brake pad 18 will thus be described herein in detail.

An elastic return spring 48 is in the form of a metal strip, for example of steel, with a rectangular cross-section the width of which extends vertically and which is made for example by cutting, drawing and folding a stainless steel sheet with a constant thickness.

With reference in particular to FIG. 7, an elastic return spring 48 includes a so-called attachment first portion 50, generally in the form of a tab 52 for attaching the spring 48 to the fixed support 14, which is connected to the end of a first rigid branch B1 and which extends in an orthogonal plane to be attached, for example by riveting, to an associated part of the fixed support 14.

From the first rectilinear branch with an axial orientation B1, the elastic return spring 48 successively extends from three other rectilinear rigid branches B2, B3 and B4 respectively.

The first branch B1 has its proximal end connected to the bend 54, whereas its distal end is axially located outside the slide 28 to be connected to the second rigid branch B2.

The second rigid branch B2 is connected to the first rigid branch B1 through a first deformable fold P1.

Like the first branch B1, the second rigid branch B2 is shaped as a strip in the extension of the first rigid branch B1.

In order that the first bend-shaped fold P1 makes up a plastically deformable zone, this portion is mechanically weakened, here by means of a window or lumen F1 which is here a rectangular-shape through cut-out.

In the same manner, the third rigid branch B3 is connected to the second rigid branch B2 through a second plastically deformable fold P2.

The second fold P2 is a bent portion of the material strip including a window F2.

Finally, the fourth branch B4 is connected to the third rigid branch B3 through a third plastically deformable fold P3.

The third fold P3 includes a window F3 analogous to windows F1 and F2.

The fourth rigid branch B4 is rectilinear and with a generally axial orientation parallel to the first rigid branch B1 and it extends here from a front free end segment intended to be directly connected to the associated brake pad 18.

The front free end segment is here made by extending the constituent strip of the branches Bi.

According to the designs illustrated in FIG. 1 or in FIG. 7, the front free end segment of the elastic return spring 48 is shaped as an active tab 62 which is bent at right angles to directly act on a portion opposite the friction lining carrier plate (FIG. 1) or to be directly attached onto an associated part of the brake pad 18 (FIG. 7), and for example of its friction lining carrier plate 19.

In the figures, the elastic return spring 48 is represented in an initial "new" state, that is before any plastic deformation of the folds Pi.

In this new or initial state, the first branch B1 and the fourth rigid branch B4 are substantially parallel to each other and with an axial orientation by being arranged at a distance transversally from each other.

In the maximum plastic deformation state—not represented—of the elastic return spring 48, the first and fourth rigid branches B1 and B4 are always substantially parallel, with an axial orientation and spaced apart from each other substantially by the same distance, whereas the three folds Pi have been plastically deformed.

By way of example, the thickness of the material strip is between 0.5 and 0.8 millimetres and the material is a stainless steel with the reference X2CrNbCu21 or the reference 304L (X2CrNi18-9/X2CrNi19-11).

By way of example, the maximum movement corresponding to a maximum wear "J2" is equal to about 14 millimetres.

When the brake pad 18 is biased to its active position by the piston 46, it first travels the path corresponding to the determined operating play "J1".

During this first part of the stroke, the brake pad 18 drives the branch B4 of the elastic return spring 48 so as to elastically tension the elastic return spring 48 between the attachment portion 50 attached to the fixed support 14, and the branch B4 connected to the brake pad 18.

The elastically deformable parts of the elastic return spring 48 thus reach their maximum elongation state.

The folds Pi are deformed, first elastically, and then plastically.

The front transverse face of the friction lining 24 of the brake pad 18 is further spaced apart, relative to the associated face or annular track of the disk 12, by a distance equal to the wear play "J2". The brake pad 18 carries on its axial stroke to its active position.

During this second stroke part, since the elastically deformable parts cannot be "elastically" deformed, the tightening strain is transmitted to the plastically deformable folds Pi of the elastic return spring 48.

The folds Pi are then plastically deformed, the elastic deformations of the plastically deformable parts being negligible relative to their plastic deformation.

When the braking operation comes to its end, the brake pad 18 is returned to its inactive position by the elastically deformable parts which resume their standby state.

The brake pad 18 is thus again spaced apart from the disk 12 by a distance equal to the single determined operating play "J1", the wear play "J2" having been absorbed by the plastic deformation of the plastically deformable folds Pi.

The elastic return spring 48 thus will ensure that the brake pad 18 is returned into its inactive position.

Moreover, the arrangement of the plastically deformable folds Pi avoids that the tightening strain to be exerted by the piston 46 to actuate the brake pad 18 to its active position becomes too high.

Further, by preserving a constant operating play "J1" between the brake pad 18 in inactive position and the disk 12, the response time of the braking system remains constant irrespective of the wear of the friction lining 24.

At a maximum full wear of the friction lining, the elastic return spring 48 is plastically deformed and, just as the used brake pad 18, it should be replaced.

According to the two designs schematically illustrated in FIGS. 1 and 7, the elastic return spring includes, in an integrated manner, the active tab 62 for "acting" on the brake pad, and in particular on the lining carrier plate 19.

A design principle according to the invention will now be described wherein the elastic return spring 48 is connected and indirectly attached to an arm of the fixed support 14, that is to a rail 32 equipping the associated arm 27.

More precisely, the portion 50 for attaching the elastic return spring 48 to the fixed support 14 includes an attachment tab 52 which axially forwardly extends along a direction parallel to the sliding direction of the brake pad 18, whereas the vertical wing 34 of the rail 32 associated with this spring includes an attachment tongue 466 which extends axially rearwardly. The attachment tab 52 and the attachment tongue 466 include complementary cooperation connection means with complementary shapes which enable both components to be assembled by elastic socketing along the axial direction.

Figure 8:
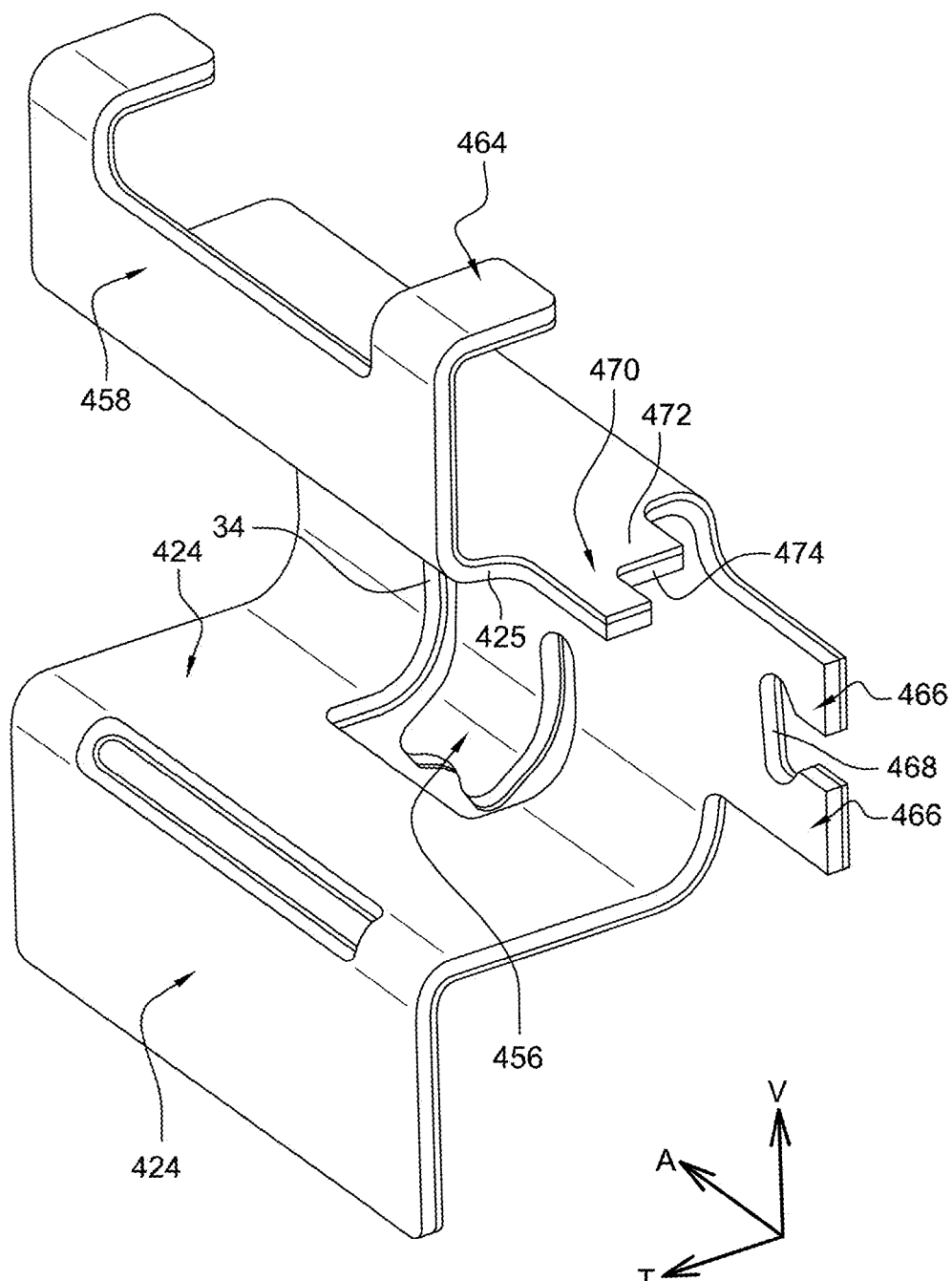
FIG. 8 is a perspective view illustrating an exemplary embodiment of a rail of a disc brake according to the invention designed to enable an elastic return spring to be attached.

Referring to FIGS. 8 and 9, it is seen that both the attachment tab 52 and the attachment tongue are each of a vertical planar strip and of an axial orientation.

The attachment tongue 466 extends in prolongation of the vertical wing 34, and the attachment tab 52 extends in prolongation of the connection branch B4.

Figure 10:
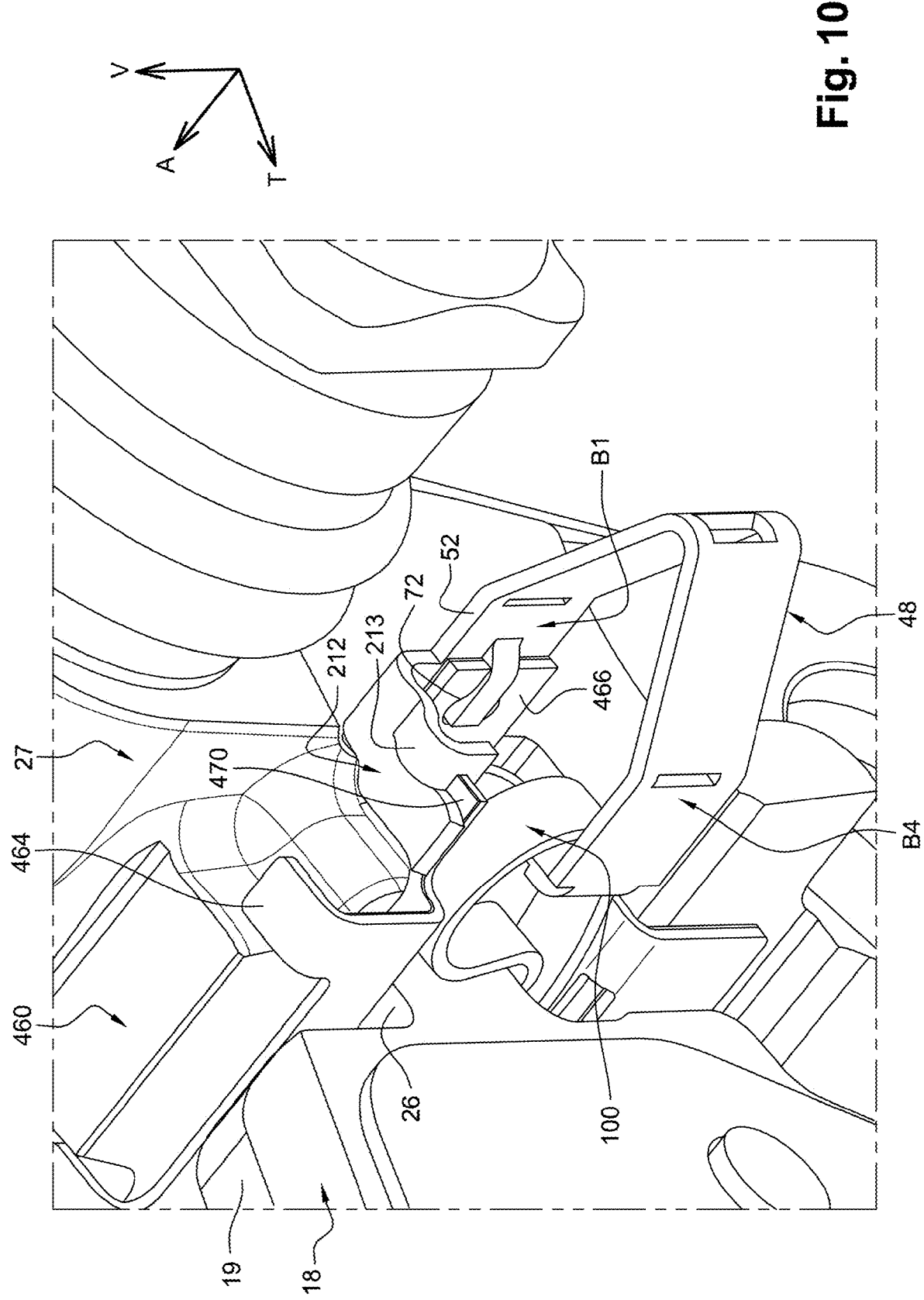
FIG. 10 is a perspective view illustrating the components of FIGS. 8 and 9 in an assembled position, the whole being illustrated mounted to the disc brake and in a "new" state of the neither elastically nor plastically deformed elastic return spring.

In an assembled position, the attachment tongue 466 and the attachment tab 52 are adjacent, plane on plane (See FIG. 10).

The complementary connection means further include a finger 72 with a transverse orientation orthogonal to the axial plane and which is carried by the attachment tab 52.

To that end, the attachment tab 52 is shaped as a clamp in which the attachment tongue 466 is axially received.

The clamp consists of the constituent strip of the attachment tab 52 and a parallel blade 68 which carries the finger 72 which is transversally oriented towards an opposite face 53 of the attachment tab.

The blade 68 is made thanks to an extrusion in the attachment tab 52 and the transverse distance separating the opposite faces of the attachment tab 52 and the blade 68 is substantially equal to the thickness of the attachment tongue 466.

To receive the finger 72, the attachment tongue 466 includes a cut-out 468 making up a notch into which the finger 72 fits.

The attachment tab 52 includes a tab 212 for stabilizing the elastic return spring 48 which cooperates with a portion of the upper horizontal wing 425 of the rail 32.

The stabilizing tab 212 transversally and horizontally extends from an axially oriented upper edge 208 of the attachment tab 52, thanks to a bend 213 folded at right angle.

The upper horizontal wing 425 of the rail 32 includes a stabilizing tongue 470 which axially rearwardly extends in the horizontal plane of this horizontal wing 425, and the stabilizing tab 212 vertically bears, through its lower face 215 against an upper face 472 of the stabilizing tongue 470.

The attachment tab 52 of the elastic return spring 48 includes an abutment tab 202 which is in contact, axially forwardly, with an opposite abutment face 474 of the rail 32 to block the axial sliding of the elastic return spring 48 in the direction corresponding to the axial movement of the brake pad 18 to its active braking position.

The abutment tab 202 extends from an axially oriented edge 208 of the attachment tab 52. Thanks to a folded bend 203, the abutment tab extends in a vertical axial plane and its front vertical edge 205 is able to cooperate with the opposite horizontal edge making up the abutment face 474.

In a mounted and assembled position of the spring 48 on the rail 32, the elastic return spring 48 only cooperates with the rail 32, neither in contact nor bearing against the arm 27.

Upon assembling the two components, that is when, by a relative axial movement, the elastic return spring 48 is mated with the associated rail 32, the complementary cooperation connection means with complementary shapes cooperate by elastic socketing.

This results in the state illustrated in FIG. 10.

Two operating zones have been added to a rail according to the state of the art. The first clamp and tongue-shaped zone enables the elastic return spring to be "clamped" to the attachment tongue 466, and thus a first placement and keeping it waiting for its "arming".

The second zone 212-202 enables firstly the elastic return spring 48 to be maintained in the radial direction, and then during the operating phases of the disc brake, translational and rotational stops. For rotation, the first zone thus allows a strain recovery in the tangential direction.

By way of non-limiting example, the active tab 62 is here shaped to cooperate with a branch of the pad spring 100, that is to act indirectly on the lining carrier plate 19.

Because of the design of the attachment part 50 and of the rail 32, both springs 48 equipping a brake pad 18, and both rails equipping the two opposite arms of the fixed support 14, are not identical and interchangeable, but they make up a pair of two associated springs 48, and of two associated rails 32, paired with a front and/or rear brake pad, the design of which is symmetrical relative to a median vertical and axial plane.

The invention is not limited to the embodiment just described. It is in particular possible to design functional mechanical inversions with a simple structure between the attachment tab 52 and the attachment tongue.

A replacement assembly or kit of a used set of brake pads 18 includes, for each brake pad, an actual new brake pad 18 equipped with a pair of elastic return springs 48 paired with the associated brake pad.

If the brake pad is of the type equipped with pad mounting springs 100, the replacement kit includes, for each brake pad, a new pad equipped with its two pad springs 100, each for one of its two radial lugs 26.

The invention claimed is:

1. A disc brake (10) for an automotive vehicle which includes:
    a brake disc (12) which extends in a plane transverse to an axially oriented axis (A) of rotation of the disc;
    a fixed support (14) including at least two opposite arms (27) having a generally vertical orientation (V), the at least two opposite arms (27) including a first arm (27) and a second arm (27), each arm (27) including a C-shaped cross-section axial housing (28) horizontally opening towards the opposite arm (27) and which is delimited by an upper face (33) and a lower face (31) with a generally horizontal orientation to thereby define at least a first housing (28) and a second housing (28);
    for each of the first and second arms (27) of the fixed support (14), a rail (32) which closely fits to walls of the housing (28) of each arm (27) to thereby provide a first rail (32) and a second rail (32), each rail (32) being attached to the fixed support, each rail (32) including at least one C-shaped cross-section sliding axial upper part (452) which is received and locked in the housing (28) associated with each rail (32), the upper part (452) including a horizontal lower wing (424), a horizontal upper wing (425), and a bottom vertical wing (34) which connects both the lower (424) and upper (425) wings together;
    at least one brake pad (18) including two mounting opposite lateral lugs (26) that include a first lateral lug (26) opposite a second lateral lug (26), the first lateral lug (26) being received in the first housing (28) of the first arm (27) with said first rail (32) interposed therebetween and the second lateral lug (26) being received in the second housing (28) of the second arm (27) with said second rail (32) interposed therebetween;
    wherein said at least one brake pad (18) includes a vertical transverse plate (19) which carries a friction lining (24) having a friction transverse face (25) that cooperates with an associated braking track (22) of the disc (12), the brake pad (18) being axially slidably mounted in the fixed support (14) between an active front position in which said friction face (25) bears against the associated braking track (22) of the disc (12), and an inactive rear position in which said friction face (25) is axially spaced apart from said associated braking track of the disc, by a determined operating play (J1); and
    at least one elastic spring (48) for elastically returning the brake pad (18) to its inactive position including at least one portion (50) for attaching the elastic return spring (48) to the fixed support (14), and including a rigid connection branch (B4), with an axial orientation parallel to the sliding direction of the brake pad, and which rigid connection branch (B4) is connected to the brake pad (18), the spring (48) being associated with one of the first and second rails (32), wherein,
    the at least one portion (50) for attaching the elastic return spring (48) to the fixed support (14) includes an attachment tab (52) which forwardly extends along an axial direction parallel to the sliding direction of the brake pad (18);
    at least one wing (34) of the one of the first and second rails (32) associated with the spring includes an attachment tongue (466) which extends axially rearwardly;
    the attachment tab (52) and the attachment tongue (466) include complementary cooperation connection means having complementary shapes, and
    the attachment tongue (466), which participates in the fixing of the attachment tab (52) of the spring, protrudes axially rearwardly relative to the rest of the one of the first and second rails.

2. The disc brake according to claim 1, wherein the complementary cooperation connection means having complementary shapes of the attachment tongue (466) and the attachment tab (52) cooperate by elastic socketing when assembled.

3. The disc brake according to claim 1, wherein:
    the attachment tongue (466) is a strip which extends in an axial plane;
    the attachment tab (52) is a strip which extends in a plane parallel to said axial plane;
    the attachment tongue (466) and the attachment tab (52) are adjacent, plane on plane.

4. The disc brake according to claim 3, wherein:
said complementary connection means include at least one finger (72) with a transverse orientation orthogonal to said axial plane which is carried by the attachment tab (52) and which is received in a notch (468) formed in the attachment tongue (466).

5. The disc brake according to claim 3, wherein a front free end segment of the rigid connection branch (B4) is a further strip which makes up an active tab (62) having a main orientation of parallel to the plane of the disc.

6. The disc brake according to claim 3, wherein the attachment tab (52) is shaped as a clamp in which the attachment tongue (466) is received.

7. The disc brake according to claim 5, wherein the attachment tab (52) is shaped as a clamp in which the attachment tongue (466) is received, and wherein said clamp includes said strip and a parallel blade (68) which carries said finger (72).

8. The disc brake according to claim 1, wherein the attachment tab (52) includes a stabilizing tab (212) for stabilizing the elastic return spring (48) which cooperates with a portion of said rail (32).

9. The disc brake according to claim 8, wherein said stabilizing tab (212) extends transversally and horizontally from an axially oriented edge (208) of the attachment tab (52) and cooperates with a portion of the horizontal wing (425) of the rail (32).

10. The disc brake according to claim 9, wherein said horizontal wing (425) of the rail (32) includes a stabilizing tongue (470) which extends axially rearwardly in the horizontal plane of the horizontal wing (425), and wherein the attachment tab (52) is bearing against an upper face (472) of the stabilizing tongue (470).

11. A disc brake according to claim 1, wherein the attachment tab (52) of the elastic return spring (48) includes an abutment tab (202) which is in contact, axially forwardly, with an opposite abutment face (474) of the rail (32).

12. The disc brake according to claim 9, wherein the attachment tab (52) of the elastic return spring (48) includes an abutment tab (202) which is in contact, axially forwardly, with an opposite abutment face (474) of the rail (32), and wherein said abutment tab (202) extends from said axially oriented edge (208) of the attachment tab (52).

13. The disc brake according to claim 1, wherein said at least one wing (34) of the rail (32) which includes the attachment tongue is the bottom vertical wing (34) of the rail.

14. The disc brake (10) according to claim 1, wherein the elastic return spring (48) includes means for taking up a wear play (J2) of the friction lining (24) of the brake pad (18), which are plastically deformed when a stroke of the brake pad up to its active braking position is higher than said determined operating play (J1).

15. The disc brake (10) according to claim 1, wherein the elastic return spring (48) is made as a single piece by cutting and forming a material sheet.

16. A replacement kit for a disc brake for an automotive vehicle which includes:
a brake disc (12) which extends in a plane transverse to an axially oriented axis (A) of rotation of the disc;
a fixed support (14) including at least two opposite arms (27) having a generally vertical orientation (V), the at least two opposite arms (27) including a first arm (27) and a second arm (27), each arm (27) including a C-shaped cross-section axial housing (28) horizontally opening towards the opposite arm (27) and which is delimited by an upper face (33) and a lower face (31) with a generally horizontal orientation to thereby define at least a first housing (28) and a second housing (28);
for each of the first and second arms (27) of the fixed support (14), a rail (32) which closely fits to walls of the housing (28) of each arm (27) to thereby provide a first rail (32) and a second rail (32), each rail (32) being attached to the fixed support, each rail (32) including at least one C-shaped cross-section sliding axial upper part (452) which is received and locked in the housing (28) associated with each rail (32), the upper part (452) including a horizontal lower wing (424), a horizontal upper wing (425), and a bottom vertical wing (34) which connects both the lower (424) and upper (425) wings together;
at least one brake pad (18) including two mounting opposite lateral lugs (26) that include a first lateral lug (26) opposite a second lateral lug (26), the first lateral lug (26) being received in the first housing (28) of the first arm (27) with said first rail (32) interposed therebetween and the second lateral lug (26) being received in the second housing (28) of the second arm (27) with said second rail (32) interposed therebetween;
wherein said at least one brake pad (18) includes a vertical transverse plate (19) which carries a friction lining (24) having a friction transverse face (25) that cooperates with an associated braking track (22) of the disc (12), the brake pad (18) being axially slidably mounted in the fixed support (14) between an active front position in which said friction face (25) bears against the associated braking track (22) of the disc (12), and an inactive rear position in which said friction face (25) is axially spaced apart from said associated braking track of the disc, by a determined operating play (J1); and
at least one elastic spring (48) for elastically returning the brake pad (18) to its inactive position including at least one portion (50) for attaching the elastic return spring (48) to the fixed support (14), and including a rigid connection branch (B4), with an axial orientation parallel to the sliding direction of the brake pad, and which rigid connection branch (B4) is connected to the brake pad (18), the spring (48) being associated with one of the first and second rails (32), wherein,
the at least one portion (50) for attaching the elastic return spring (48) to the fixed support (14) includes an attachment tab (52) which forwardly extends along an axial direction parallel to the sliding direction of the brake pad (18);
at least one wing (34) of the one of the first and second rails (32) associated with the spring includes an attachment tongue (466) which extends axially rearwardly;
the attachment tab (52) and the attachment tongue (466) include complementary cooperation connection means having complementary shapes, and
the attachment tongue (466), which participates in the fixing of the attachment tab (52) of the spring, protrudes axially rearwardly relative to the rest of the one of the first and second rails,
wherein the replacement kit includes the at least one brake pad (18) and two of the at least one elastic return springs (48) paired with said brake pad (18).

17. The replacement kit according to claim 16, further comprising two springs (100) for mounting the at least one brake pad in the disc brake.

* * * * *